United States Patent
Kim

(10) Patent No.: US 9,715,292 B2
(45) Date of Patent: Jul. 25, 2017

(54) MULTILAYER TOUCH PANEL WITH VISIBLE AND NON-VISIBLE AREAS AND METHOD OF FABRICATION THEREOF

(71) Applicant: Samsung Electronics Co., Ltd., Suwon-si, Gyeonggi-do (KR)

(72) Inventor: Hyung-In Kim, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 14/279,999

(22) Filed: May 16, 2014

(65) Prior Publication Data

US 2015/0193044 A1 Jul. 9, 2015

(30) Foreign Application Priority Data

Jan. 8, 2014 (KR) .................. 10-2014-0002213

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01)

(58) Field of Classification Search
CPC ............ G06F 3/041–3/047; G06F 2203/04112
See application file for complete search history.

(56) References Cited

U.S. PATENT DOCUMENTS

| 8,568,599 | B1 | 10/2013 | Yu et al. |
| 8,766,085 | B2 * | 7/2014 | Tokioka ................ H01L 31/05 |
| | | | 136/244 |
| 2009/0266621 | A1 | 10/2009 | Huang et al. |
| 2010/0073310 | A1 | 3/2010 | Liang et al. |
| 2012/0274602 | A1 | 11/2012 | Bita et al. |
| 2013/0335345 | A1 | 12/2013 | Liu et al. |
| 2014/0182894 | A1 | 7/2014 | Liu et al. |
| 2014/0340593 | A1 * | 11/2014 | Sato ..................... G02F 1/13338 |
| | | | 349/12 |
| 2015/0042903 | A1 | 2/2015 | Misaki |

FOREIGN PATENT DOCUMENTS

| CN | 203250289 U | 10/2013 |
| KR | 10-2006-0016509 A | 2/2006 |
| WO | 2013105566 A1 | 7/2013 |

* cited by examiner

*Primary Examiner* — Gene W Lee
(74) *Attorney, Agent, or Firm* — Jefferson IP Law, LLP

(57) ABSTRACT

A touch panel and a method for fabricating the touch panel are provided. The touch panel includes a window substrate, a first conductive layer provided on a top surface of the window substrate, a metal electrode layer provided on a top surface of the first conductive layer and patterned into a first pattern, and a second conductive layer provided on top surfaces of the first conductive layer and the metal electrode layer and patterned into a second pattern, and surrounding the metal electrode layer.

28 Claims, 16 Drawing Sheets

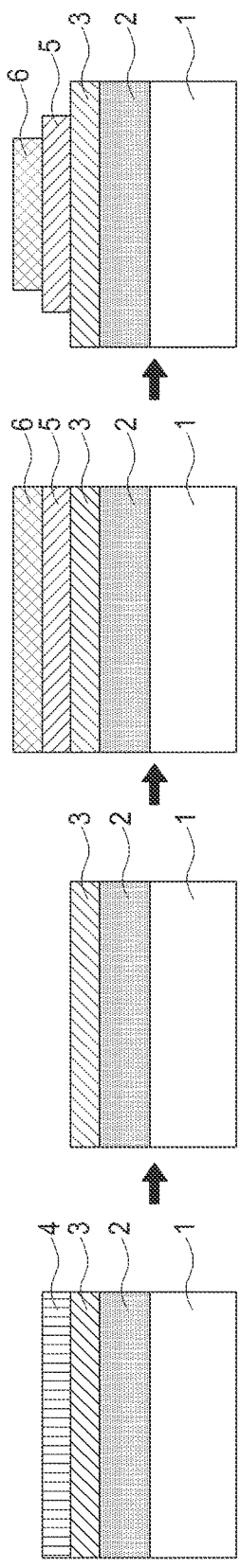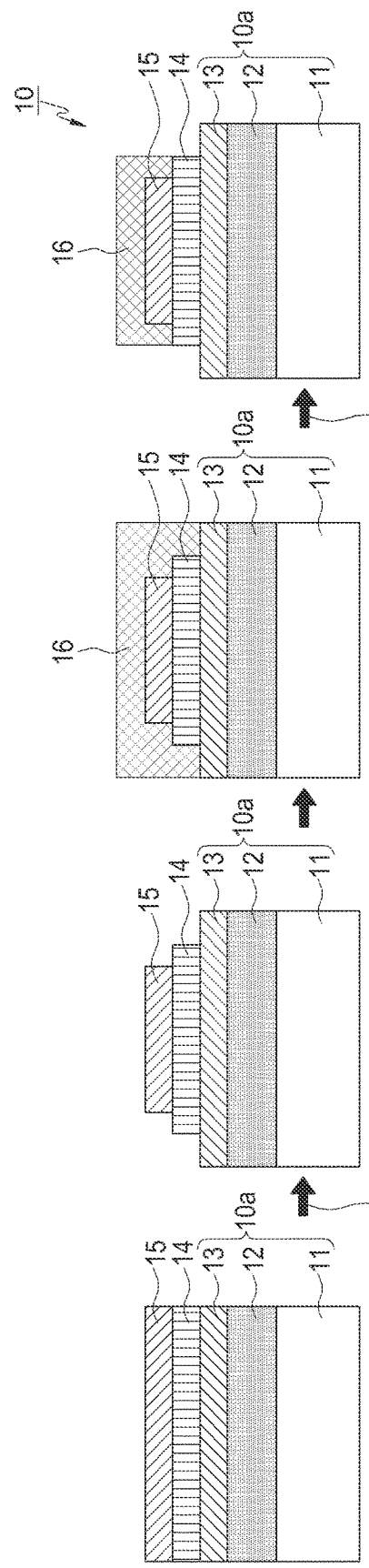

MULTILAYER TOUCH PANEL WITH VISIBLE AND NON-VISIBLE AREAS AND METHOD OF FABRICATION THEREOF

CROSS-REFERENCE TO RELATED APPLICATION(S)

This application claims the benefit under 35 U.S.C. §119(a) of a Korean patent application filed on Jan. 8, 2014 in the Korean Intellectual Property Office and assigned Serial number 10-2014-0002213, the entire disclosure of which is hereby incorporated by reference.

TECHNICAL FIELD

The present disclosure relates to a touch panel for use in an electronic device and a method for fabricating the touch panel.

BACKGROUND

Owing to the rapid development of multimedia technology and display technology, display devices have become widely used as electronic devices. Accordingly, more and more display devices employ a touch panel.

A touch panel recognizes the coordinates of a point on a screen touched by a finger and/or an object and processes a specific function by executing a software command corresponding to the touched point, which obviates the need for an additional input tool and/or input device such as a keyboard, a mouse, and the like.

There are largely two types of touch panels, resistive touch panel and capacitive touch panel. To implement a capacitive touch panel, first electrodes serving as driving lines (for Transmission (Tx)) and second electrodes serving as sensing lines (for Reception (Rx)) should be configured independently. The first and second electrodes may form patterns on the same or different layers. Intersections between the first and second electrodes, each intersection forming one pair of (X, Y) coordinates, should be isolated from one another by means of insulators.

Depending on their operation principles, touch panels may be categorized into an InfraRed (IR) type, a Surface Acoustic Wave (SAW) type, an ElectroMagnetic (EM) type, and an ElectroMagnetic Resonance (EMR) type.

From the perspective of structure, a touch panel may be configure as one of a glass Touch Screen Panel (TSP), a Glass Film Film (GFF) TSP, a hybrid Glass-One Film (G1F) TSP, and a G2 (integrated cover-glass) TSP. The glass TSP has a glass sensor inserted between a cover glass and a display panel. Despite excellent optical characteristics compared to a film-based TSP, the glass TSP becomes less popular due to a heavy, thick substrate and high cost. The G1F TSP is fabricated by depositing one layer of Indium Tin Oxide (ITO) on the rear surface of a window, patterning the ITO layer, and then attaching one layer of ITO on the other axis. In the G2 TSP, a touch sensor is implemented by depositing two X-axis and Y-axis layers of ITO on the rear surface of a window. That is, the G2 TSP has an integrated structure in which electrodes are formed directly on a cover glass without an additional sensor layer. Due to the absence of an additional glass or film substrate, the G2 TSP boasts of excellent optical characteristics and low material cost and makes it possible to implement a thin, lightweight substrate. Therefore, the G2 TSP is regarded as an ideal touch panel structure.

For example, the first and second electrodes may be formed of ITO composed of indium oxide (In2O3) and tin oxide (SnO2). The ITO has high transmittance, despite high resistivity compared to metals such as copper or silver.

FIGS. 1A to 1D sequentially illustrate an operation for fabricating a touch panel according to the related art. Referring to FIG. 1A, a window 1 is fabricated and an ink-printed layer 2 is provided on the top surface of the window 1. A reflective coating layer 3 is attached onto the top layer of the ink-printed layer 2 and a first electrode 4 is provided on the top surface of the reflective coating layer 3. Referring to FIG. 1B, a first pattern is formed. Referring to FIG. 1C, a second electrode 5 is provided on the top surface of the first electrode 4 and a metal electrode layer 6 is deposited on the top surface of the second electrode 5. Referring to FIG. 1D, a second pattern is formed by etching.

When the first pattern is formed, the first electrode is removed from an invisible area of the window. The window is divided into a visible area visible to a user and the invisible area corresponding to the remaining area except for the visible area. That is, the touch panel includes a visible area visible to the user and an invisible area invisible to the user.

In the touch panel of the related art, a metal electrode layer formed of silver (Ag) used in a current process has high electrical conductivity but is vulnerable to breakage due to low physical strength. Since the metal electrode layer is positioned on the top layer of the touch panel, the metal electrode layer is vulnerable to breakage during transfer and post-processing. Moreover, the touch panel of the related art experiences a chemical change at the metal electrode layer due to introduced moisture in a high-temperature, high-humidity environment. As a result, the metal electrode layer is discolored and suffers from degraded electrical characteristics and weakened adhesion.

Thus, it may be concluded that the metal electrode layer of the related art is easily broken due to low physical strength, is vulnerable to a chemical change due to exposure to the outside, and has degraded electrical characteristics and weakened adhesion.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a touch panel in which a conductive layer is formed to surround a metal electrode layer of a window unit, in order to shield the metal electrode layer against exposure and to prevent breakage, ambient moisture-caused chemical change, discoloration, degraded electric characteristics, and weakened adhesion of the metal electrode layer, and a method for fabricating the touch panel.

An aspect of the present disclosure is to provide a touch panel in which a single conductive layer is formed to surround a metal electrode layer, so that fabrication cost is reduced due to no need for an additional conductive layer and a fabrication process time is shortened due to no need for an additional conductive layer process, and a method for fabricating the touch panel.

In accordance with an aspect of the present disclosure, a touch panel is provided. The touch panel includes a window substrate, a first conductive layer provided on a top surface of the window substrate, a metal electrode layer provided on a top surface of the first conductive layer and patterned into a first pattern, and a second conductive layer provided on top surfaces of the first conductive layer and the metal electrode layer and patterned into a second pattern, and surrounding the metal electrode layer.

In accordance with an aspect of the present disclosure, a method for fabricating a touch panel is provided. The method includes fabricating a window substrate, providing a first conductive layer on a top surface of the window substrate, providing a metal electrode layer on a top surface of the first conductive layer, patterning the metal electrode layer into a first pattern, providing a second conductive layer on top surfaces of the first conductive layer and the metal electrode layer, and patterning the second conductive layer into a second pattern, and surrounding the metal electrode layer with the second conductive layer.

In accordance with an aspect of the present disclosure, a touch panel is provided. The touch panel includes a window substrate, a metal electrode layer provided on a top surface of the window substrate and patterned into a first pattern, and a conductive layer provided on a top surface of the metal electrode layer and patterned into a second pattern, and surrounding the metal electrode layer.

In accordance with an aspect of the present disclosure, a method for fabricating a touch panel is provided. The method includes fabricating a window substrate, providing a metal electrode layer on a top surface of the window substrate, patterning the metal electrode layer into a first pattern, providing a conductive layer on a top surface of the metal electrode layer, and patterning the conductive layer into a second pattern, and surrounding the metal electrode layer with the conductive layer.

In accordance with an aspect of the present disclosure, a touch panel is provided. The touch panel includes a window substrate, an organic coating layer provided on a top surface of the window substrate, a first conductive layer provided on a top surface of the organic coating layer, a metal electrode layer provided on a top surface of the first conductive layer and patterned into a first pattern, and a second conductive layer provided on top surfaces of the first conductive layer and the metal electrode layer and patterned into a second pattern, and surrounding the metal electrode layer.

In accordance with an aspect of the present disclosure, a method for fabricating a touch panel is provided. The method includes fabricating a window substrate, providing an organic coating layer on a top surface of the window substrate, providing a first conductive layer on a top surface of the organic coating layer, providing a metal electrode layer on a top surface of the first conductive layer, patterning the metal electrode layer into a first pattern, providing a second conductive layer on top surfaces of the first conductive layer and the metal electrode layer, and patterning the second conductive layer into a second pattern, and surrounding the metal electrode layer with the second conductive layer.

In accordance with an aspect of the present disclosure, a touch panel is provided. The touch panel includes a window substrate, an organic coating layer provided on a top surface of the window substrate, a metal electrode layer provided on a top surface of the organic coating layer and patterned into a first pattern, and a conductive layer provided on a top surface of metal electrode layer and patterned into a second pattern, and surrounding the metal electrode layer.

In accordance with an aspect of the present disclosure, a method for fabricating a touch panel is provided. The method includes fabricating a window substrate, providing an organic coating layer on a top surface of the window substrate, providing a metal electrode layer on a top surface of the organic coating layer, patterning the metal electrode layer into a first pattern, providing a conductive layer on a top surface of the metal electrode layer, and patterning the conductive layer into a second pattern, and surrounding the metal electrode layer with the conductive layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A, 1B, 1C, and 1D sequentially illustrate an operation for fabricating a touch panel according to the related art;

FIGS. 2A, 2B, 2C, and 2D sequentially illustrate an operation for fabricating a touch panel having a reflective coating layer according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 3:
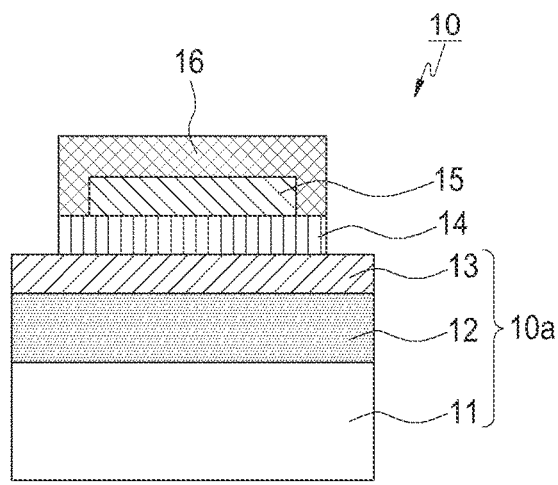
FIG. 3 illustrates a structure of a touch panel having a reflective coating layer according to an embodiment of the present disclosure.

FIGS. 2A to 2D sequentially illustrate an operation for fabricating a touch panel having a reflective coating layer according to an embodiment of the present disclosure, and FIG. 3 illustrates a structure of a touch panel having a reflective coating layer according to an embodiment of the present disclosure.

With reference to FIGS. 2A to 3, a structure of a touch panel 10 will be described below. The touch panel 10 includes a window substrate 10a, a first conductive layer 14, a metal electrode layer 15, and a second conductive layer 16.

The window substrate 10a may include a window unit 11 divided into a visible area (not shown) and an invisible area (not shown), an ink-printed layer 12, and a reflective coating layer 13.

The ink-printed layer 12 is provided on the top surface of the invisible area of the window unit 11 to render various colors.

The first conductive layer 14 is provided on the top surface of the reflective coating layer 13.

The metal electrode layer 15 is provided on the top surface of the first conductive layer 14 and etched into a first pattern A1.

The second conductive layer 16 is provided on the top surfaces of the first conductive layer 14 and the metal electrode layer 15 and etched into a second pattern A2, surrounding the metal electrode layer 15.

Since the second conductive layer 16 is formed to surround the metal electrode layer 15 in the touch panel 10 having the reflective coating layer 13 as described above, the top and side surfaces of the metal electrode layer 15 are shielded against outward exposure. Therefore, the second conductive layer 16 may prevent the metal electrode layer 15 from being damaged during transfer and post-processing and experiencing a chemical change caused by moisture introduced from an ambient environment, discoloration, degradation of electrical characteristics, and weakened adhesion.

In the embodiment of the present disclosure, a capacitive touch panel will be taken as an example of the touch panel 10. The capacitive touch panel 10 detects a touched position based on a variation in capacitance between the first conductive layer 14 (i.e. a sensor electrode) and the second conductive layer 16 (i.e. a driving electrode). For example, a variation in the capacitance of a specific point is sensed by sequentially measuring capacitance at a plurality of intersections between a plurality of first conductive layers 14 arranged along a horizontal axis and a plurality of second conductive layers 16 arranged along a vertical axis. It is assumed that the touch panel 10 has a G2 TSP structure. The G2 TSP has electrodes integrated on a cover class without a sensor layer.

The first and second conductive layers 14 and 16 are formed of Indium Tin Oxide (ITO) in the embodiment of the present disclosure. The use of ITO for the first and second conductive layers 14 and 16 should not be construed as limiting the present disclosure. The first and second conductive layers 14 and 16 may be formed of any other material having high electrical conductivity in various modified embodiments of the present disclosure. For example, the first and second conductive layers 14 and 16 may be formed of one of zinc oxide (ZnO), Graphene, a conductive polymer, Carbon Nano Tube (CNT), Zinc Tin Oxide (ZTO), Gallium Zinc Oxide (GZO), Aluminum Zinc Oxide (AZO), Indium Zinc Oxide (IZO), niobium-doped titanium dioxide (TIO2;Nb), carbon-doped magnesium hydroxide (Mg(OH)2:C), and silver (Ag).

Wiring patterns of the first and second conductive layers 14 and 16 may be formed by a photoresist process.

The touch panel 10 is applied to an electronic device. In an embodiment of the present disclosure, the electronic device may be any of all mobile communication terminals operating in conformance to communication protocols corresponding to various communication systems, all information and communication devices, multimedia devices, and their applications, including Portable Multimedia Player (PMP), MP3 player, navigator, game console, laptop computer, advertisement board, TeleVision (TV), digital broadcasting player, Personal Digital Assistant (PDA), smart phone, and the like.

The window unit 11 is divided into the visible area (not shown) and the invisible area (not shown). That is, the touch panel 10 includes a visible area visible to a user and an invisible area hidden by a bezel forming a part of a housing of the electronic device and thus invisible to the user. For example, although the touch panel 10 may output an image even in the invisible area, the image is invisible to the user because the image is hidden by the bezel.

The appearance of the window unit 11 may be enhanced by applying ink or a black mattress to the invisible area of the window unit 11.

The window unit 11 may be formed of glass in an embodiment of the present disclosure, to which the present disclosure is not limited. In various modified embodiments of the present disclosure, the window unit 11 may be formed of a transparent material other than glass. For example, the window unit 11 may be formed of one of acryl, polyethylene, polyethylene terephthalate, and poly carbonate.

The metal electrode layer 15 may be formed of silver (Ag). Alternatively, the metal electrode layer 15 may be formed of a material other than silver (Ag). For example, the metal electrode layer 15 may be formed of one of gold (Au), lead (Pb), copper (Cu), chrome (Cr), molybdenum (Mb), palladium (Pd), tin (Sn), platinum (Pt), aluminum (Al), and a compound of two or more of these materials.

As described before, FIGS. 2A to 2D sequentially illustrate an operation for fabricating a touch panel according to an embodiment of the present disclosure.

Referring to FIG. 2A, the window unit 11 is fabricated in such a manner that the window unit 11 is divided into the visible area and the invisible area and the ink-printed layer 12 is provided on the top surface of the invisible area of the window unit 11. The reflective coating layer 13 is provided on the top surface of the ink-printed layer 12. The first conductive layer 14 is provided on the top surface of the reflective coating layer 13 and the metal electrode layer 15 is provided on the top surface of the first conductive layer 14.

Referring to FIG. 2B, the first pattern A1 is formed by etching the metal electrode layer 15.

Referring to FIG. 2C, in this state, the second conductive layer 16 is provided on the top surfaces of the first conductive layer 14 and the metal electrode layer 15.

Referring to FIG. 2D, the second pattern A2 is formed by etching the second conductive layer 16 so that the second conductive layer 16 may surround the metal electrode layer 15.

As a consequence, the first and second conductive layers 14 and 16 shield the side surfaces of the metal electrode layer 15 as well as the top and bottom surfaces of the metal electrode layer, thereby preventing an adhesion failure of the metal electrode layer 15 and fundamentally preventing a defect originating from the side surfaces of the metal electrode layer 15. Accordingly, the adhesion of the metal electrode layer 15 may be reinforced.

Figure 4:
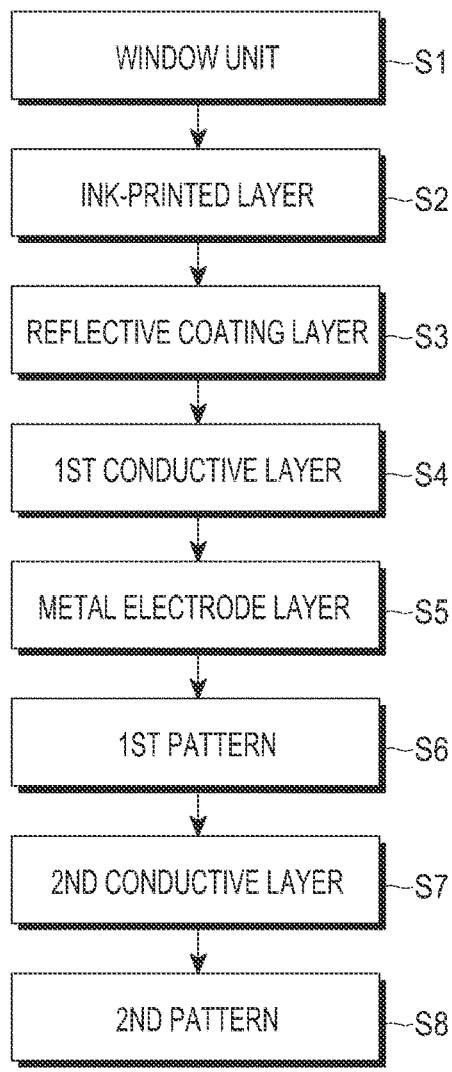
FIG. 4 is a flowchart illustrating a method for fabricating a touch panel having a reflective coating layer according to an embodiment of the present disclosure.

FIG. 4 is a flowchart illustrating a method for fabricating a touch panel having a reflective coating layer according to an embodiment of the present disclosure.

Referring to FIG. 4, the method for fabricating a touch panel is described. The window substrate 10a including the window unit 11 divided into the visible area and the invisible area, the ink-printed layer 12, and the reflective coating layer 13 is fabricated of glass in operation S1.

The invisible area includes a bezel area of the window unit 11. The appearance of the window unit 11 is enhanced by applying ink or a black mattress to the invisible area.

The ink-printed layer 12 is provided on the top surface of the invisible area in operation S2.

The reflective coating layer 13 is provided on the top surface of the ink-printed layer 12 in operation S3.

The first conductive layer 14 is provided on the top surface of the reflective coating layer 13 in operation S4.

The metal electrode layer 15 is provided on the top surface of the first conductive layer 14 in operation S5.

The first pattern A1 is formed by etching the metal electrode layer 15 in operation S6.

The second conductive layer 16 is provided on the top surfaces of the first conductive layer 14 and the metal electrode layer 15 in operation S7.

The second pattern A2 is formed by etching the second conductive layer 16 so that the second conductive layer 16 may surround the metal electrode layer 15 in operation S8.

Wiring patterns of the first and second conductive layers 14 and 16 are formed by a photoresist process.

As described before, the touch panel 10 may be a capacitive type in terms of touch mechanism and may have a G2 TSP structure.

A touch panel of the related art is configured to have a metal electrode layer (6 in FIGS. 1C and 1D) exposed to the outside. Therefore, the metal electrode layer is vulnerable to breakage during transfer and post-processing. Moreover, the touch panel of the related art experiences a chemical change at the metal electrode layer due to moisture introduced from an ambient environment. As a result, the metal electrode layer is discolored and suffers from degraded electrical characteristics and weakened adhesion.

In contrast, the first and second conductive layers 14 and 16 shield the top, side, and bottom surfaces of the metal electrode layer 15, thereby fundamentally preventing an adhesion defect originating from the side surfaces of the metal electrode layer 15. Accordingly, the adhesion of the metal electrode layer 15 may be reinforced and a product failure may be prevented.

Figure 5:
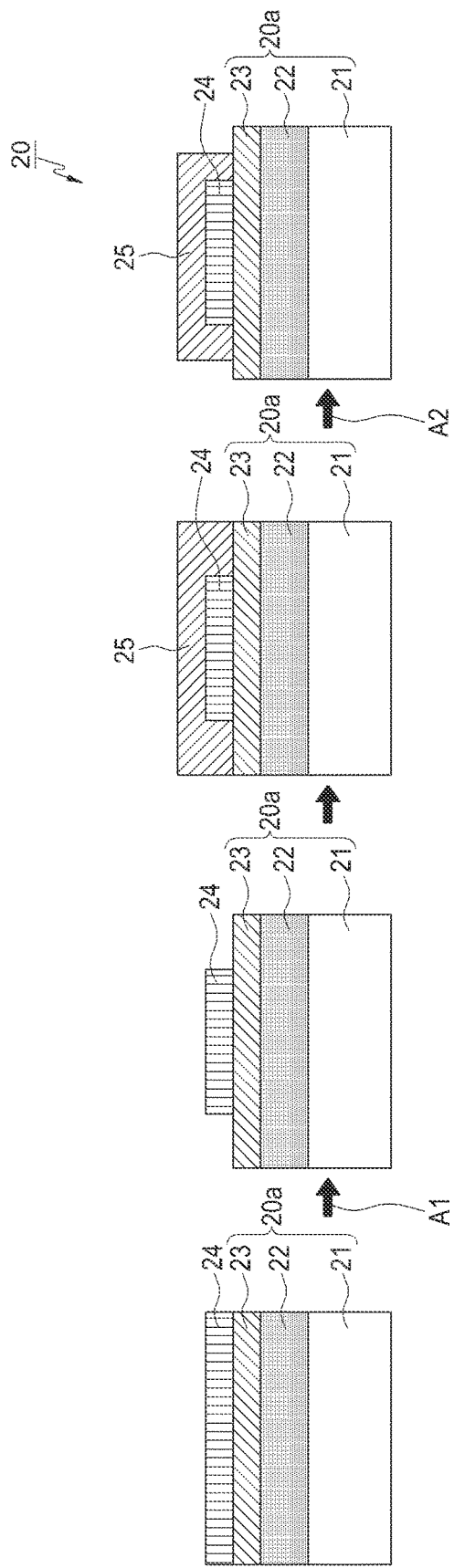
FIGS. 5A, 5B, 5C, and 5D sequentially illustrate an operation for fabricating a touch panel having a reflective coating layer according to an embodiment of the present disclosure.
Figure 6:
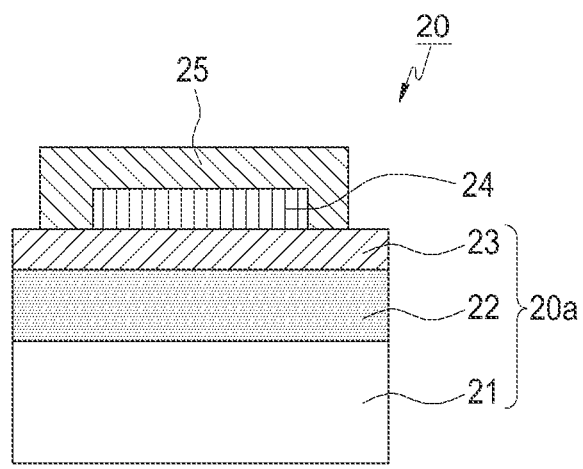
FIG. 6 illustrates a structure of a touch panel having a reflective coating layer according to an embodiment of the present disclosure.

With reference to FIGS. 5A to 6, a touch panel having a reflective coating layer according to another embodiment of the present disclosure will be described. The following description will focus mainly on differences from the aforedescribed touch panel.

FIGS. 5A to 5D illustrate an operation for fabricating a touch panel having a reflective coating layer according to an embodiment of the present disclosure, and FIG. 6 illustrates a structure of a touch panel having a reflective coating layer according to an embodiment of the present disclosure.

Referring to FIGS. 5A to 6, a structure of a touch panel 20 will be described below. The touch panel 20 includes a window substrate 20a, a metal electrode layer 24, and a conductive layer 25.

The window substrate 20a may include a window unit 21 divided into a visible area (not shown) and an invisible area (not shown), an ink-printed layer 22, and a reflective coating layer 23.

The ink-printed layer 22 is provided on the top surface of the invisible area of the window unit 21 to render various colors.

The reflective coating layer 23 is provided on the top surface of the ink-printed layer 22.

The metal electrode layer 24 is provided on the top surface of the reflective coating layer 23 and etched into the first pattern A1.

The conductive layer 25 is provided on the top surface of the metal electrode layer 24 and etched into the second pattern A2, surrounding the metal electrode layer 24.

Since the touch panel 20 is configured such that the single conductive layer 25 surrounds and thus shields the metal electrode layer 24, there is no need for an additional conductive layer. As a consequence, fabrication cost may be reduced and a fabrication process time may be shortened. Furthermore, the single conductive layer 25 shields the side surfaces of the metal electrode layer 24 and prevents exposure of the metal electrode layer 24, thereby preventing the metal electrode layer 24 from being broken during transfer and post-processing and from experiencing a chemical change caused by moisture introduced from an ambient environment, discoloration, degraded electrical characteristics, and weakened adhesion.

The operation principle and structure of the touch panel 20 are identical to those of the afore-described touch panel.

Likewise, the conductive layer 25, the window unit 21, and the metal electrode layer 24 are formed of the same materials as those of their counterparts in the afore-described touch panel.

The window unit 21 is divided into the visible area and the invisible area. That is, the touch panel 20 includes a visible area visible to a user and an invisible area hidden by a bezel forming a part of a housing of an electronic device and thus invisible to the user. For example, although the touch panel 20 may output an image even in the invisible area, the image is invisible to the user because the image is hidden by the bezel.

The appearance of the window unit 21 may be enhanced by applying ink or a black mattress to the invisible area of the window unit 21.

As described before, FIGS. 5A to 5D sequentially illustrate an operation for fabricating a touch panel according to an embodiment of the present disclosure.

In FIG. 5A, the window unit 21 is fabricated in such a manner that the window unit 21 is divided into the visible area and the invisible area and the ink-printed layer 22 is provided on the top surface of the invisible area of the window unit 21. The reflective coating layer 23 is provided on the top surface of the ink-printed layer 22. The metal electrode layer 24 is provided on the top surface of the reflective coating layer 23.

In FIG. 5B, the first pattern A1 is formed by etching the metal electrode layer 24. In FIG. 5C, in this state, the single conductive layer 25 is provided on the top surface of the metal electrode layer 24. In FIG. 5D, the second pattern A2 is formed by etching the conductive layer 25 so that the conductive layer 25 may surround the metal electrode layer 24.

As a consequence, the conductive layer 25 shields the side surfaces of the metal electrode layer 24 as illustrated in FIG. 6. Due to the resulting obviation of the need for an additional conductive layer, fabrication cost and a fabrication process time may be reduced. In addition, an adhesion failure of the metal electrode layer 24 may be prevented and the adhesion of the metal electrode layer 24 may be reinforced.

Figure 7:
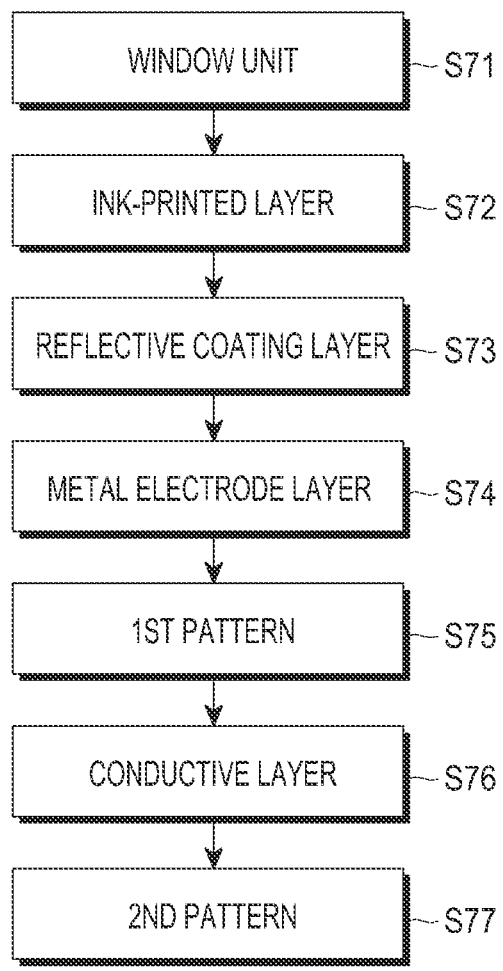
FIG. 7 is a flowchart illustrating a method for fabricating a touch panel having a reflective coating layer according to an embodiment of the present disclosure.

FIG. 7 is a flowchart illustrating a method for fabricating a touch panel having a reflective coating layer according to an embodiment of the present disclosure.

Referring to FIG. 7, the method for fabricating a touch panel will be described. The window substrate 20a including the window unit 21 divided into the visible area and the invisible area, the ink-printed layer 22, and the reflective coating layer 23 is fabricated of glass in operation S71.

The invisible area includes a bezel area of the window unit 21. The appearance of the window unit 21 is enhanced by applying ink or a black mattress to the invisible area.

The ink-printed layer 22 is provided on the top surface of the invisible area in operation S72.

The reflective coating layer 23 is provided on the top surface of the ink-printed layer 22 in operation S73.

The metal electrode layer 24 is provided on the top surface of the reflective coating layer 23 in operation S74.

The first pattern A1 is formed by etching the metal electrode layer 24 in operation S75.

The conductive layer 25 is provided on the top surface of the metal electrode layer 24 in operation S76.

The second pattern A2 is formed by etching the conductive layer 25 so that the conductive layer 25 may surround the metal electrode layer 24 in operation S77.

A wiring pattern of the conductive layer 25 is formed by a photoresist process.

In the embodiment of the present disclosure, the side surfaces of the metal electrode layer 24 are shielded by the single conductive layer 25. The resulting obviation of the need for attaching an additional conductive layer leads to a decrease in the number of parts. Therefore, fabrication cost and a fabrication process time may also be reduced.

Figure 8:
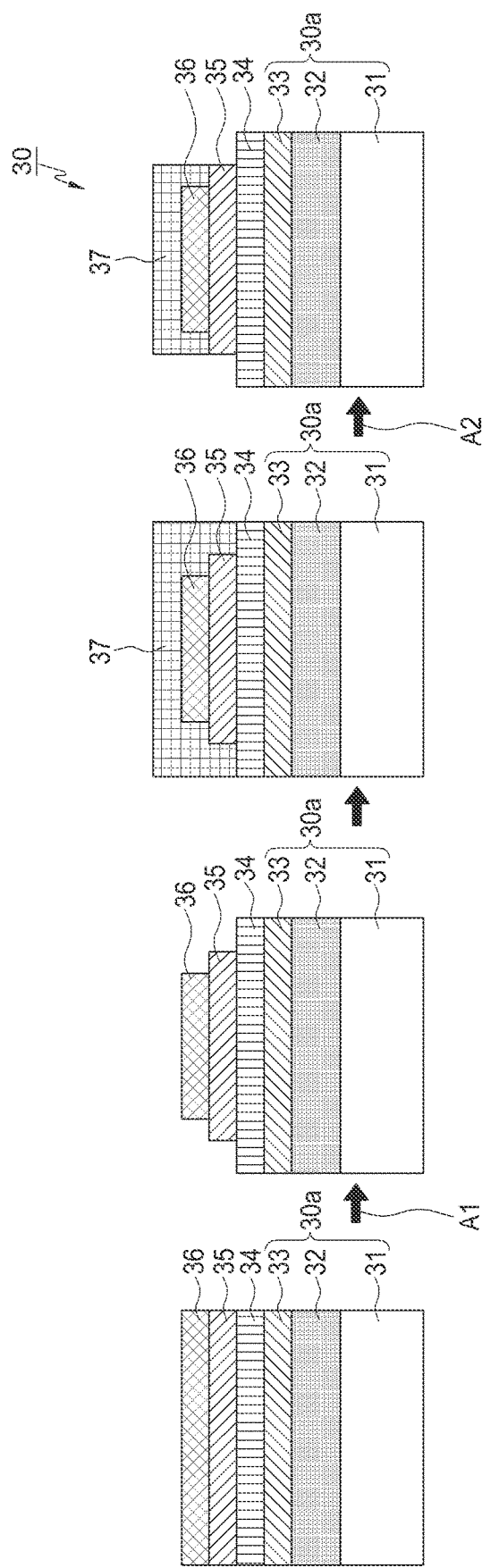
FIGS. 8A, 8B, 8C, and 8D sequentially illustrate an operation for fabricating a touch panel having a reflective coating layer according to an embodiment of the present disclosure.
Figure 9:
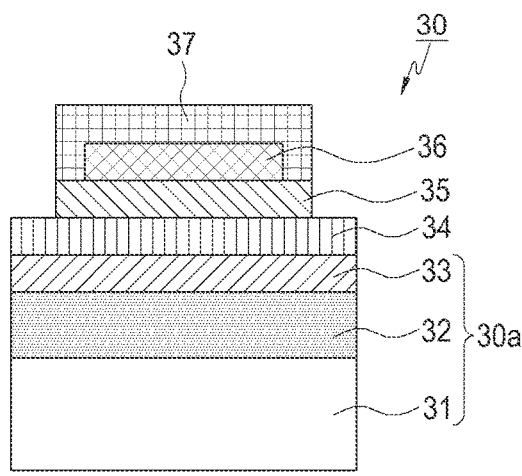
FIG. 9 illustrates a structure of a touch panel having a reflective coating layer according to an embodiment of the present disclosure.

With reference to FIGS. 8A to 9, a touch panel having a reflective coating layer according to an embodiment of the present disclosure will be described. The following description will focus mainly on differences from the afore-described touch panels.

FIGS. 8A to 8D sequentially illustrate an operation for fabricating a touch panel having a reflective coating layer according to an embodiment of the present disclosure, and FIG. 9 illustrates a structure of a touch panel having a reflective coating layer according to an embodiment of the present disclosure.

Referring to FIGS. 8A to 9, a structure of a touch panel 30 will be described below. The touch panel 30 includes a window substrate 30a, an organic coating layer 34, a first conductive layer 35, a metal electrode layer 36, and a second conductive layer 37.

The window substrate 30a may include a window unit 31 divided into a visible area (not shown) and an invisible area (not shown), an ink-printed layer 32, and a reflective coating layer 33.

The ink-printed layer 32 is provided on the top surface of the invisible area of the window unit 31 to render various colors.

The reflective coating layer 33 is provided on the top surface of the ink-printed layer 32. The organic coating layer 34 is provided on the top surface of the reflective coating layer 33 to cover foreign materials or bumps on the surface of the ink-printed layer 32.

The first conductive layer 35 is provided on the top surface of the organic coating layer 34.

The metal electrode layer 36 is provided on the top surface of the first conductive layer 35 and etched into the first pattern A1.

The second conductive layer 37 is provided on the top surfaces of the first conductive layer 35 and the metal electrode layer 36 and etched into the second pattern A2, surrounding the metal electrode layer 36.

Since the touch panel 30 having the organic coating layer 34 is configured to include the second conductive layer 37 surrounding the metal electrode layer 36, the top and side surfaces of the metal electrode layer 36 are shielded against exposure to the outside. Therefore, the second conductive layer 37 prevents the metal electrode layer 36 from being broken during transfer and post-processing and from suffering from a chemical change caused by moisture introduced from an ambient environment, discoloration, degradation of electrical characteristics, and weakened adhesion.

The operation principle and structure of the touch panel 30 are identical to those of the afore-described touch panels.

Likewise, the first and second conductive layers 35 and 37, the window unit 31, and the metal electrode layer 36 are formed of the same materials as those of their counterparts in the afore-described touch panels.

The touch panel 30 having the organic coating layer 34 is divided into the visible area and the invisible area. Specifically, the touch panel 30 includes the visible area visible to a user and the invisible area hidden by a bezel forming a part of a housing of an electronic device and thus invisible to the user. For example, although the touch panel 30 may output an image even in the invisible area, the image is invisible to the user because the image is hidden by the bezel.

The appearance of the window unit 31 may be enhanced by applying ink or a black mattress to the invisible area of the window unit 31.

In the embodiment of the present disclosure, the touch panel 30 having the organic coating layer 34 has a G2 TSP structure, by way of example.

As described before, FIGS. 8A to 8D sequentially illustrate an operation for fabricating a touch panel according to an embodiment of the present disclosure.

In FIG. 8A, the window unit 31 is fabricated in such a manner that the window unit 31 is divided into the visible area and the invisible area and the ink-printed layer 32 is provided on the top surface of the invisible area of the window unit 31. The reflective coating layer 33 is provided on the top surface of the ink-printed layer 32. The organic coating layer 33 is provided on the top surface of the reflective coating layer 33 and the first conductive layer 35 is provided on the organic coating layer 34. The metal electrode layer 36 is provided on the top surface of the first conductive layer 35.

In FIG. 8B, the first pattern A1 is formed by etching the metal electrode layer 36. In FIG. 8C, in this state, the second conductive layer 37 is provided on the top surfaces of the first conductive layer 35 and the metal electrode layer 36. In FIG. 8D, the second pattern A2 is formed by etching the second conductive layer 37 so that the second conductive layer 37 may surround the metal electrode layer 36.

As illustrated in FIG. 9, the first and second conductive layers 35 and 37 shield the top, side, and bottom surfaces of the metal electrode layer 36, with the organic coating layer 34 covering foreign materials and bumps on the ink-printed layer 32, thereby preventing an adhesion failure of the metal electrode layer 36 and fundamentally preventing a defect originating from the side surfaces of the metal electrode layer 36. Accordingly, the adhesion of the metal electrode layer 36 may be reinforced.

Figure 10:
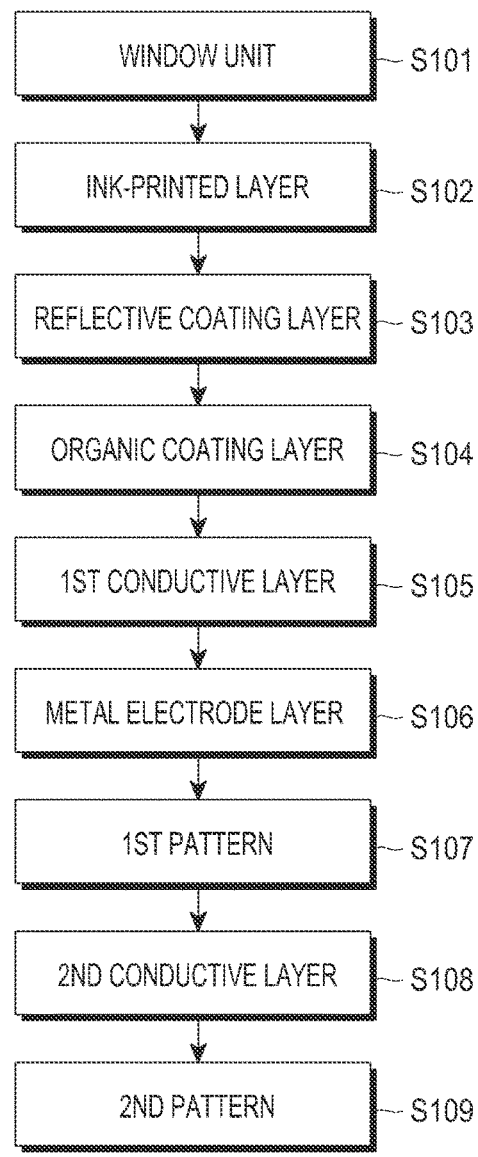
FIG. 10 is a flowchart illustrating a method for fabricating a touch panel having a reflective coating layer according to an embodiment of the present disclosure.

FIG. 10 is a flowchart illustrating a method for fabricating a touch panel having a reflective coating layer according to an embodiment of the present disclosure.

Referring to FIG. 10, the method for fabricating the touch panel 30 will be described. The window substrate 30a including the window unit 31 divided into the visible area and the invisible area, the ink-printed layer 32, and the reflective coating layer 33 is fabricated of glass in operation S101.

The invisible area includes a bezel area of the window unit 31. The appearance of the window unit 31 is enhanced by applying ink or a black mattress to the invisible area.

The ink-printed layer 32 is provided on the top surface of the invisible area in operation S102.

The reflective coating layer 33 is provided on the top surface of the ink-printed layer 32 in operation S103.

The organic coating layer 34 is provided on the top surface of the reflective coating layer 33 to cover foreign materials and bumps on the surface of the ink-printed layer 32 in operation S104.

The first conductive layer 35 is provided on the top surface of the organic coating layer 34 in operation S105.

The metal electrode layer 36 is provided on the top surface of the first conductive layer 35 in operation S106.

The first pattern A1 is formed by etching the metal electrode layer 36 in operation S107.

The second conductive layer 37 is provided on the top surfaces of the first conductive layer 35 and the metal electrode layer 36 in operation S108.

The second pattern A2 is formed by etching the second conductive layer 37 so that the second conductive layer 37 may surround the metal electrode layer 36 in operation S109.

As described before, the touch panel 30 having the organic coating layer 34 may be a capacitive touch panel having a G2 TSP structure.

In the embodiment of the present disclosure, the organic coating layer 34 covers foreign materials and bumps on the surface of the ink-printed layer 32 and the first and second conductive layers 35 and 37 formed on the organic coating layer 34 shield the top, bottom, and side surfaces of the metal electrode layer 36, thereby fundamentally preventing a defect originating from the side surfaces of the metal electrode layer 36. As a consequence, the adhesion of the metal electrode layer 36 may be reinforced and a product failure may be prevented.

Figure 11:
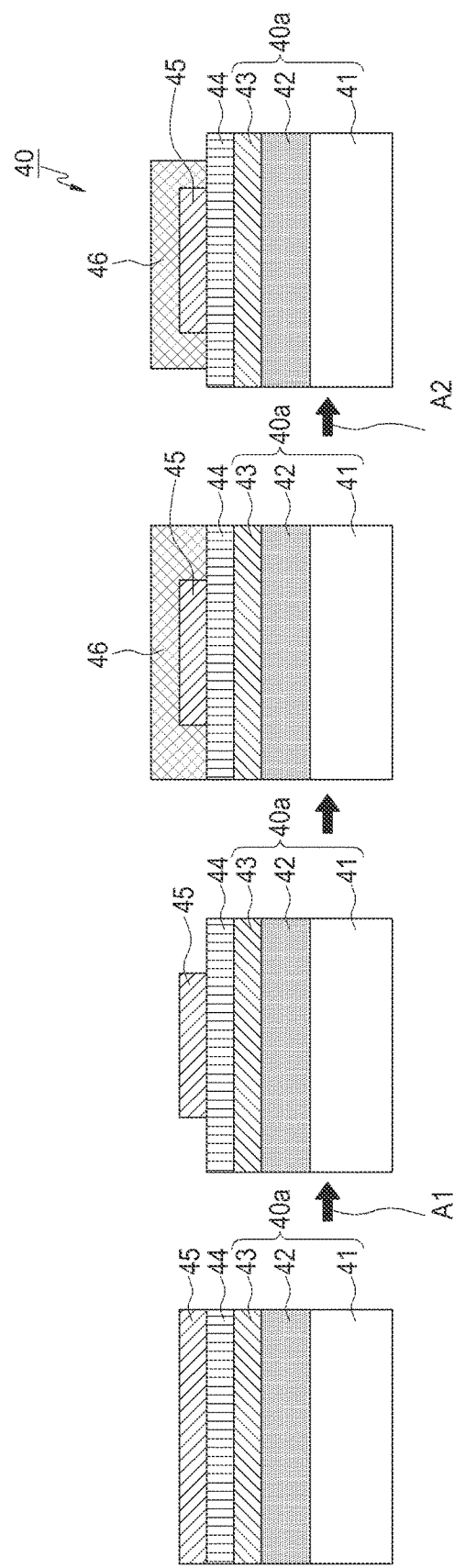
FIGS. 11A, 11B, 11C, and 11D sequentially illustrate an operation for fabricating a touch panel having a reflective coating layer according to an embodiment of the present disclosure.
Figure 12:
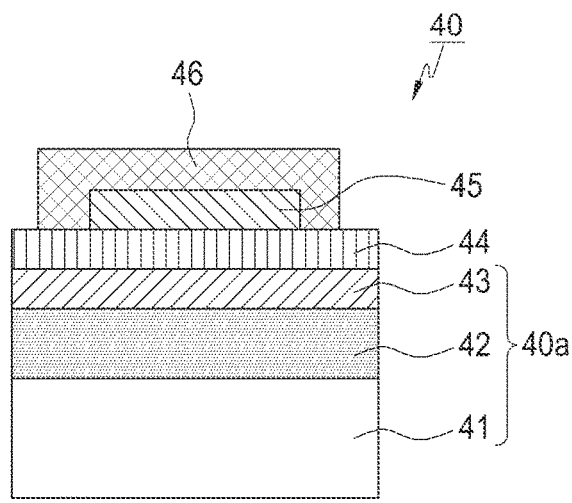
FIG. 12 illustrates a structure of a touch panel having a reflective coating layer according to an embodiment of the present disclosure.

With reference to FIGS. 11A to 12, a touch panel having a reflective coating layer according to an embodiment of the present disclosure will be described. The following description will focus mainly on differences from the afore-described touch panels.

FIGS. 11A to 11D sequentially illustrate an operation for fabricating a touch panel having a reflective coating layer according to an embodiment of the present disclosure, and FIG. 12 illustrates a structure of a touch panel having a reflective coating layer according to an embodiment of the present disclosure.

Referring to FIGS. 11A to 12, a structure of a touch panel 40 will be described below. The touch panel 40 includes a window substrate 40a, an organic coating layer 44, a metal electrode layer 45, and a conductive layer 46.

The window substrate 40a may include a window unit 41 divided into a visible area (not shown) and an invisible area (not shown), an ink-printed layer 42, and a reflective coating layer 43.

The ink-printed layer 42 is provided on the top surface of the invisible area of the window unit 31 to render various colors.

The reflective coating layer 43 is provided on the top surface of the ink-printed layer 42.

The organic coating layer 44 is provided on the top surface of the reflective coating layer 43 to cover foreign materials or bumps on the surface of the ink-printed layer 42.

The metal electrode layer 45 is provided on the top surface of the organic coating layer 44 and etched into the first pattern A1.

The conductive layer 46 is provided on the top surface of the metal electrode layer 45 and etched into the second pattern A2, surrounding the metal electrode layer 45.

Since the touch panel 40 having the organic coating layer 44 is configured to include the single conductive layer 46 surrounding the metal electrode layer 45, the resulting obviation of the need for attaching an additional conductive layer leads to a decrease in the number of parts and reduces fabrication cost and a fabrication process time. Furthermore, the side surfaces of the metal electrode layer 45 are shielded against outward exposure, which prevents the metal electrode layer 46 from being broken during transfer and post-processing and from experiencing a chemical change caused by moisture introduced from an ambient environment, discoloration, degradation of electrical characteristics, and weakened adhesion.

The operation principle and structure of the touch panel 40 are identical to those of the afore-described touch panels.

Likewise, the conductive layer 46, the window unit 41, and the metal electrode layer 45 are formed of the same materials as those of their counterparts in the afore-described touch panels.

The touch panel 40 having the organic coating layer 44 is divided into a visible area and an invisible area. That is, the touch panel 40 includes a visible area visible to a user and an invisible area hidden by a bezel forming a part of a housing of an electronic device and thus invisible to the user. For example, although the touch panel 40 may output an image even in the invisible area, the image is invisible to the user because the image is hidden by the bezel.

In the embodiment of the present disclosure, the touch panel 40 having the organic coating layer 44 has a G2 TSP structure, by way of example.

As described before, FIGS. 11A to 11D sequentially illustrate an operation for fabricating a touch panel according to an embodiment of the present disclosure.

In FIG. 11A, the window unit 41 is fabricated in such a manner that the window unit 41 is divided into the visible area and the invisible area and the ink-printed layer 42 is provided on the top surface of the invisible area of the window unit 41. The reflective coating layer 43 is provided on the top surface of the ink-printed layer 42. The organic coating layer 43 is provided on the top surface of the reflective coating layer 43 and the metal electrode layer 45 is provided on the top surface of the organic coating layer 44.

In FIG. 11B, the first pattern A1 is formed by etching the metal electrode layer 45. In FIG. 11C, in this state, the conductive layer 46 is provided on the top surface of the metal electrode layer 45. In FIG. 11D, the second pattern A2 is formed by etching the conductive layer 46 so that the conductive layer 46 may surround the metal electrode layer 45.

As illustrated in FIG. 12, since the single conductive layer 46 formed on the top surface of the organic coating layer 44 shields the side surfaces of the metal electrode layer 45, there is no need for an additional conductive layer. Therefore, fabrication cost and a fabrication process time may be reduced. In addition, with the organic coating layer 44 covering foreign materials and bumps on the ink-printed layer 42, the single conductive layer 46 surrounds the metal electrode layer 45, thereby preventing an adhesion failure of the metal electrode layer 45 and fundamentally preventing a defect originating from the side surfaces of the metal electrode layer 45. Accordingly, the adhesion of the metal electrode layer 45 may be reinforced.

Figure 13:
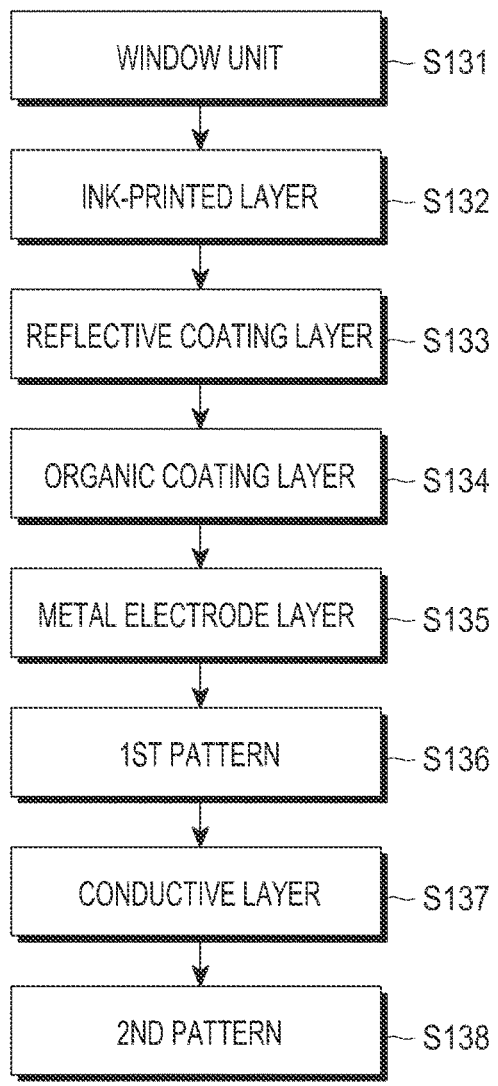
FIG. 13 is a flowchart illustrating a method for fabricating a touch panel having a reflective coating layer according to an embodiment of the present disclosure.

FIG. 13 is a flowchart illustrating a method for fabricating a touch panel having a reflective coating layer according to an embodiment of the present disclosure.

Referring to FIG. 13, the method for fabricating the touch panel 40 will be described below. The window substrate 40a including the window unit 41 divided into the visible area and the invisible area, the ink-printed layer 42, and the reflective coating layer 43 is fabricated of glass in operation S131.

The invisible area includes a bezel area of the window unit 41. The appearance of the window unit 41 is enhanced by applying ink or a black mattress to the invisible area.

The ink-printed layer 42 is provided on the top surface of the invisible area in operation S132.

The reflective coating layer 43 is provided on the top surface of the ink-printed layer 42 in operation S133.

The organic coating layer 44 is provided on the top surface of the reflective coating layer 43 to cover foreign materials and bumps on the surface of the ink-printed layer 42 in operation S134.

The metal electrode layer 45 is provided on the top surface of the organic coating layer 44 in operation S135.

The first pattern A1 is formed by etching the metal electrode layer 45 in operation S136.

The conductive layer 46 is provided on the top surface of the metal electrode layer 45 in operation S137.

The second pattern A2 is formed by etching the conductive layer 46 so that the conductive layer 46 may surround the metal electrode layer 45 in operation S138.

As described before, the touch panel 40 having the organic coating layer 44 may be a capacitive touch panel having a G2 TSP structure.

In the embodiment of the present disclosure, the organic coating layer 44 covers foreign materials and bumps on the surface of the ink-printed layer 42 and the side surfaces of the metal electrode layer 45 are shielded by the single conductive layer 46 formed on the organic coating layer 44. Therefore, an additional conductive layer is not needed, thus reducing fabrication cost and a fabrication process time. Furthermore, since a defect originating from the side surfaces of the metal electrode layer 45 is prevented, the adhesion of the metal electrode layer 36 may be reinforced and a product failure may be prevented.

With reference to FIGS. 14A to 14D, a touch panel without a reflective coating layer according to an embodiment of the present disclosure will be described. The following description will focus mainly on differences from the afore-described touch panels.

FIGS. 14A to 14D sequentially illustrate an operation for fabricating a touch panel without a reflective coating layer according to an embodiment of the present disclosure.

Figure 14:
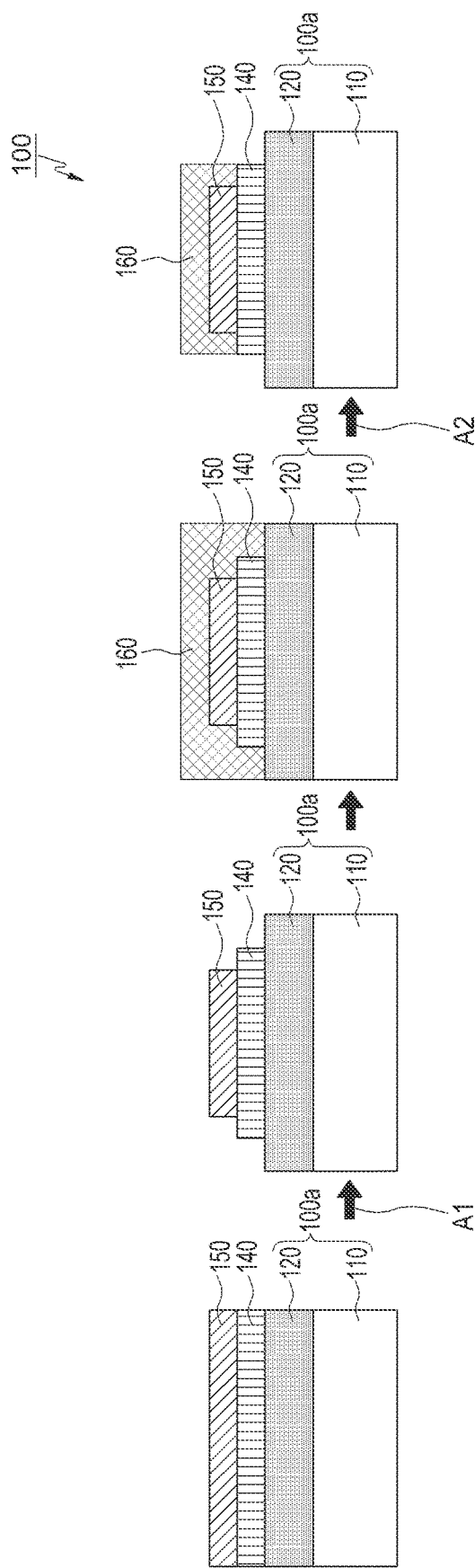
FIGS. 14A, 14B, 14C, and 14D sequentially illustrate an operation for fabricating a touch panel without a reflective coating layer according to an embodiment of the present disclosure.

Referring to FIGS. 14A to 14B, a structure of a touch panel 100 will be described below. The touch panel 100 includes a window substrate 100a, a first conductive layer 140, a metal electrode layer 150, and a second conductive layer 160.

The window substrate 100a may include a window unit 110 divided into a visible area (not shown) and an invisible area (not shown) and an ink-printed layer 120, without a conventional reflective coating layer.

The ink-printed layer 120 is provided on the top surface of the invisible area of the window unit 110 to render various colors.

The first conductive layer 140 is provided on the top surface of the ink-printed layer 120. The metal electrode layer 150 is provided on the top surface of the first conductive layer 140 and etched into the first pattern A1.

The second conductive layer 160 is provided on the top surfaces of the first conductive layer 140 and the metal electrode layer 150 and etched into the second pattern A2, surrounding the metal electrode layer 150.

Since the touch panel 100 without a reflective coating layer is configured to include the second conductive layer 160 surrounding the metal electrode layer 150 on the window substrate 100a, the top and side surfaces of the metal electrode layer 150 are shielded against outward exposure. Therefore, breakage during transfer and post-processing, a chemical change caused by moisture introduced from an ambient environment, discoloration, degradation of electrical characteristics, and weakened adhesion may be prevented for the metal electrode layer 150. Due to no need for the conventional reflective coating layer, fabrication cost and a fabrication process time may be reduced.

The operation principle and structure of the touch panel 100 are identical to those of the afore-described touch panels and thus will not be described herein to avoid redundancy.

Likewise, the first and second conductive layers 140 and 160, the window unit 110, and the metal electrode layer 150 are formed of the same materials as those of their counterparts in the afore-described touch panels.

The window unit 110 is divided into the visible area and the invisible area. That is, the touch panel 100 includes a visible area visible to a user and an invisible area hidden by a bezel forming a part of a housing of an electronic device and thus invisible to the user. For example, although the touch panel 100 may output an image even in the invisible area, the image is invisible to the user because the image is hidden by the bezel.

In the embodiment of the present disclosure, the touch panel 100 has a G2 TSP structure, by way of example.

As described before, FIGS. 14A to 14D sequentially illustrate an operation for fabricating a touch panel according to an embodiment of the present disclosure.

In FIG. 14A, the window unit 110 is fabricated in such a manner that the window unit 110 is divided into the visible area and the invisible area and the ink-printed layer 120 is provided on the top surface of the invisible area of the window unit 110. The first conductive layer 140 is provided on the top surface of the ink-printed layer 120. The metal electrode layer 150 is provided on the top surface of the first conductive layer 140.

In FIG. 14B, the first pattern A1 is formed by etching the metal electrode layer 150. In FIG. 14C, in this state, the second conductive layer 160 is provided on the top surfaces of the first conductive layer 140 and the metal electrode layer 150. In FIG. 14D, the second pattern A2 is formed by etching the second conductive layer 160 so that the second conductive layer 160 may surround the metal electrode layer 150.

Since the first and second conductive layers 140 and 160 shield the side surfaces of the metal electrode layer 150 as well as the top and bottom surfaces of the metal electrode layer 150, an adhesion failure of the metal electrode layer 150 is prevented and a defect originating from the side surfaces of the metal electrode layer 150 is also fundamentally prevented. Accordingly, the adhesion of the metal electrode layer 150 may be reinforced.

Figure 15:
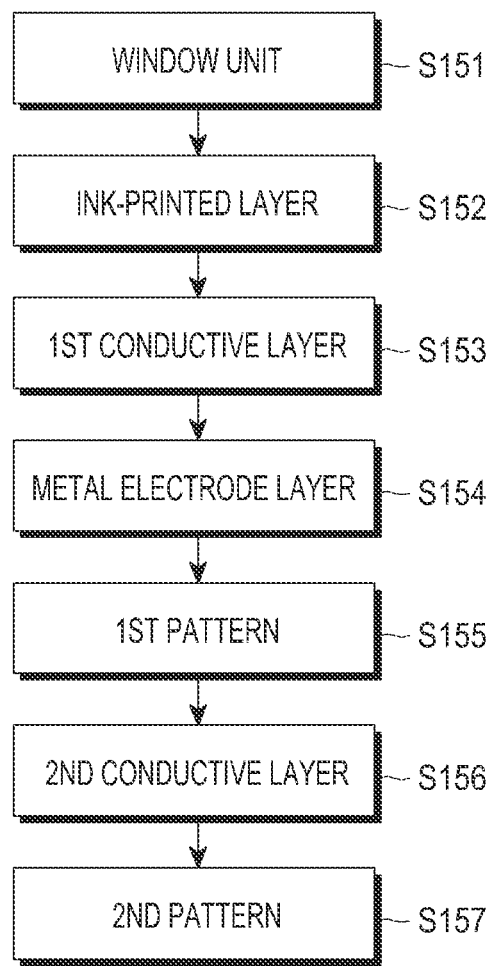
FIG. 15 is a flowchart illustrating a method for fabricating a touch panel without a reflective coating layer according to an embodiment of the present disclosure.

FIG. 15 is a flowchart illustrating a method for fabricating a touch panel without a reflective coating layer according to an embodiment of the present disclosure.

Referring to FIG. 15, the method for fabricating the touch panel 100 will be described. The window substrate 100a including the window unit 110 divided into the visible area and the invisible area and the ink-printed layer 120 is fabricated of glass in operation S151.

That is, the window substrate 100a is fabricated so as to include the window unit 110 and the ink-printed layer 120, without a conventional reflective coating layer.

The invisible area includes a bezel area of the window unit 110. The appearance of the window unit 110 is enhanced by applying ink or a black mattress to the invisible area.

The ink-printed layer 120 is provided on the top surface of the invisible area in operation S152.

The first conductive layer 140 is provided on the top surface of the ink-printed layer in operation S153.

The metal electrode layer 150 is provided on the top surface of the first conductive layer 140 in operation S154.

The first pattern A1 is formed by etching the metal electrode layer 150 in operation S155.

The second conductive layer 160 is provided on the top surfaces of the first conductive layer 140 and the metal electrode layer 150 in operation S156.

The second pattern A2 is formed by etching the second conductive layer 160 so that the second conductive layer 160 may surround the metal electrode layer 150 in operation S157.

Wiring patterns of the first and second conductive layers 140 and 160 are formed by a photoresist process.

In the embodiment of the present disclosure, the first and second conductive layers 140 and 160 shield the side surfaces as well as the top and bottom surfaces of the metal electrode layer 150, thereby fundamentally preventing a defect originating from the side surfaces of the metal electrode layer 150, reinforcing the adhesion of the metal electrode layer 150, and preventing a product failure. Furthermore, since the number of parts of the touch panel 100 is reduced by fabricating the window substrate 100a including the window unit 110 and the ink-printed layer 120, without a conventional reflective coating layer, fabrication cost and a fabrication process time may be reduced.

With reference to FIGS. 16A to 16D, a touch panel without a reflective coating layer according to an embodiment of the present disclosure will be described. The following description will focus mainly on differences from the afore-described touch panels.

FIGS. 16A to 16D sequentially illustrate an operation for fabricating a touch panel without a reflective coating layer according to an embodiment of the present disclosure.

Referring to FIGS. 16A to 16D, a structure of a touch panel 200 will be described below. The touch panel 200 includes a window substrate 200a, a metal electrode layer 240, and a conductive layer 250.

The window substrate 200a may include a window unit 210 divided into a visible area (not shown) and an invisible area (not shown) and an ink-printed layer 220, without a conventional reflective coating layer.

The ink-printed layer 220 is provided on the top surface of the invisible area of the window unit 210 to render various colors.

The metal electrode layer 240 is provided on the top surface of the ink-printed layer 220 and etched into the first pattern A1.

The conductive layer 250 is provided on the top surface of the metal electrode layer 240 and etched into the second pattern A2, surrounding the metal electrode layer 240.

Since the single conductive layer 250 shields the metal electrode layer 240 by surrounding metal electrode layer 240 in the touch panel 200, there is no need for an additional conductive layer, thus reducing fabrication cost. Due to no need for processes for a conventional reflective coating layer and an additional conductive layer, a fabrication process time may be shortened. Because the single conductive layer 250 shields the metal electrode layer 240 against outward exposure, breakage during transfer and post-processing, a chemical change caused by moisture introduced from an ambient environment, discoloration, degradation of electrical characteristics, and weakened adhesion may be prevented for the metal electrode layer 240. Furthermore, the window substrate 200a includes the window unit 210 and the ink-printed layer 220, without the conventional reflective coating layer. The resulting decrease in the number of parts leads to further reduction of the fabrication cost and the fabrication processing time.

The operation principle and structure of the touch panel 200 are identical to those of the afore-described touch panels.

Likewise, the conductive layer 250, the window unit 210, and the metal electrode layer 250 are formed of the same materials as those of their counterparts in the afore-described touch panels.

The window unit 210 is divided into the visible area and the invisible area. That is, the touch panel 200 includes a visible area visible to a user and an invisible area hidden by a bezel forming a part of a housing of an electronic device and thus invisible to the user. For example, although the touch panel 200 may output an image even in the invisible area, the image is invisible to the user because the image is hidden by the bezel.

Figure 16:
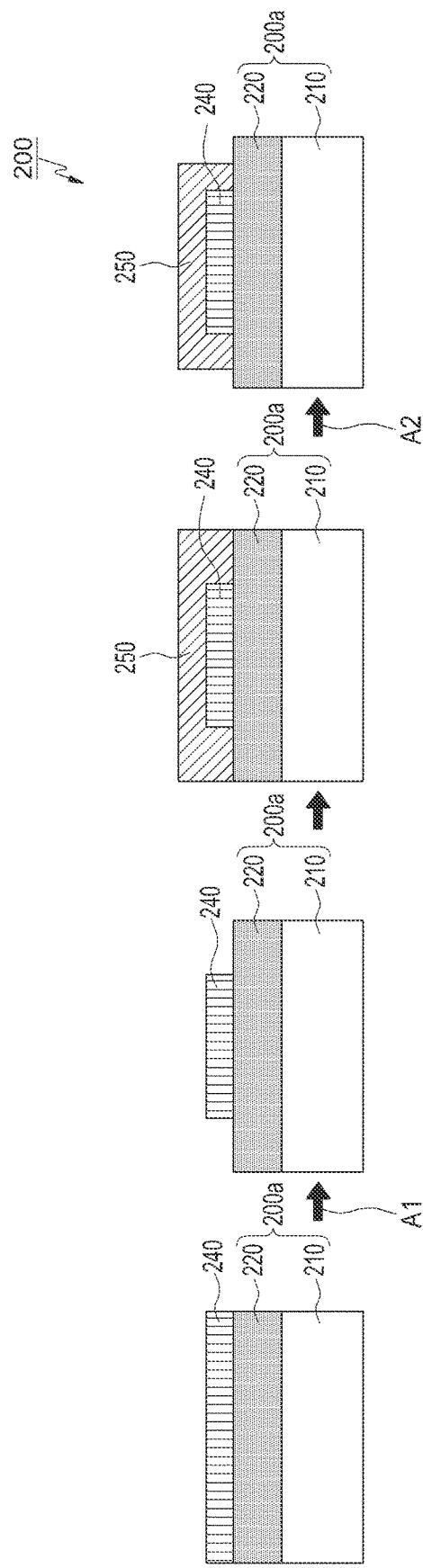
FIGS. 16A, 16B, 16C, and 16D sequentially illustrate an operation for fabricating a touch panel without a reflective coating layer according to an embodiment of the present disclosure.

As described before, FIGS. 16A to 16D sequentially illustrate an operation for fabricating a touch panel according to an embodiment of the present disclosure. In FIG. 16A, the window unit 210 is fabricated in such a manner that the window unit 210 is divided into the visible area and the invisible area and the ink-printed layer 220 is provided on the top surface of the invisible area of the window unit 210. The metal electrode layer 150 is provided on the top surface of the ink-printed layer 220.

In FIG. 16B, the first pattern A1 is formed by etching the metal electrode layer 240. In FIG. 16C, in this state, the conductive layer 250 is provided on the top surface of the metal electrode layer 240. In FIG. 16D, the second pattern A2 is formed by etching the conductive layer 250 so that the conductive layer 250 may surround the metal electrode layer 240.

Since the single conductive layer 250 shields the side surfaces of the metal electrode layer 240, there is no need for an additional conductive layer, thus reducing fabrication cost and a fabrication process time. In addition, an adhesion failure and a defect originating from the side surfaces of the metal electrode layer 240 are prevented for the metal electrode layer 240. Therefore, the adhesion of the metal electrode layer 240 may be reinforced.

Figure 17:
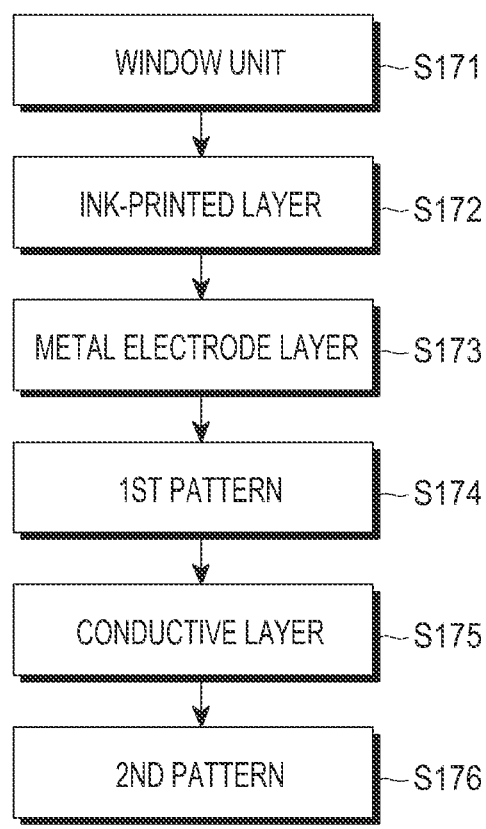
FIG. 17 is a flowchart illustrating a method for fabricating a touch panel without a reflective coating layer according to an embodiment of the present disclosure.

FIG. 17 is a flowchart illustrating a method for fabricating a touch panel without a reflective coating layer according to an embodiment of the present disclosure.

Referring to FIG. 17, the method for fabricating the touch panel 200 will be described below. The window substrate 200a including the window unit 210 divided into the visible area and the invisible area and the ink-printed layer 220 is fabricated of glass in operation S171.

That is, the window substrate 200a is fabricated so as to include the window unit 210 and the ink-printed layer 220, without a conventional reflective coating layer. The resulting decrease in the number of parts may lead to reduced fabrication cost.

The invisible area includes a bezel area of the window unit 210. The appearance of the window unit 210 is enhanced by applying ink or a black mattress to the invisible area.

The ink-printed layer 220 is provided on the top surface of the invisible area in operation S172.

The metal electrode layer 240 is provided on the top surface of the ink-printed layer 220 in operation S173.

The first pattern A1 is formed by etching the metal electrode layer 240 in operation S174.

The conductive layer 250 is provided on the top surface of the metal electrode layer 240 in operation S175.

The second pattern A2 is formed by etching the conductive layer 250 so that the conductive layer 250 may surround the metal electrode layer 240 in operation S176.

In the embodiment of the present disclosure, since the single conductive layer 250 shields the side surfaces of the metal electrode layer 240, there is no need for attaching an additional conductive layer. The resulting decrease in the number of parts may lead to reduction of fabrication cost and a fabrication process time.

With reference to FIGS. 18A to 18D, a touch panel without a reflective coating layer according to an embodiment of the present disclosure will be described. The following description will focus mainly on differences from the afore-described touch panels.

FIGS. 18A to 18D illustrate an operation for fabricating a touch panel without a reflective coating layer according to an embodiment of the present disclosure.

Referring to FIGS. 18A to 18D, a structure of a touch panel 300 will be described below. The touch panel 300 includes a window substrate 300a, an organic coating layer 340, a first conductive layer 350, a metal electrode layer 360, and a second conductive layer 370.

The window substrate 300a may include a window unit 310 divided into a visible area (not shown) and an invisible area (not shown) and an ink-printed layer 320, without a conventional reflective coating layer.

The ink-printed layer 320 is provided on the top surface of the invisible area of the window unit 310 to render various colors.

The organic coating layer 340 is provided on the top surface of the ink-printed layer 320 to cover foreign materials or bumps on the surface of the ink-printed layer 320.

The first conductive layer 350 is provided on the top surface of the organic coating layer 340.

The metal electrode layer 360 is provided on the top surface of the first conductive layer 350 and etched into the first pattern A1.

The second conductive layer 370 is provided on the top surfaces of the first conductive layer 350 and the metal electrode layer 360 and etched into the second pattern A2, surrounding the metal electrode layer 360.

Since the second conductive layer 370 is formed to surround the metal electrode layer 360 in the touch panel 300 having the organic coating layer 340 without a reflective coating layer, the second conductive layer 370 shields the top and side surfaces of the metal electrode layer 360 against outward exposure. Therefore, breakage during transfer and post-processing, a chemical change caused by moisture introduced from an ambient environment, discoloration, degradation of electrical characteristics, and weakened adhesion may be prevented for the metal electrode layer 360. In addition, there is no need for a process of attaching the conventional reflective coating layer. The resulting decrease in the number of parts leads to reduction of fabrication cost and a fabrication process time.

The operation principle and structure of the touch panel 300 are identical to those of the touch panels described before and will not be described herein to avoid redundancy.

Likewise, the first and second conductive layers 350 and 370, the window unit 310, and the metal electrode layer 360 are formed of the same materials as those of their counterparts in the afore-described touch panel 300.

The touch panel 300 having the organic coating layer 340 is divided into a visible area and an invisible area. That is, the touch panel 300 includes a visible area visible to a user and an invisible area hidden by a bezel forming a part of a housing of an electronic device and thus invisible to the user. For example, although the touch panel 300 may output an image even in the invisible area, the image is invisible to the user because the image is hidden by the bezel.

In the embodiment of the present disclosure, the touch panel 300 having the organic coating layer 340 has a G2 TSP structure, by way of example.

Figure 18:
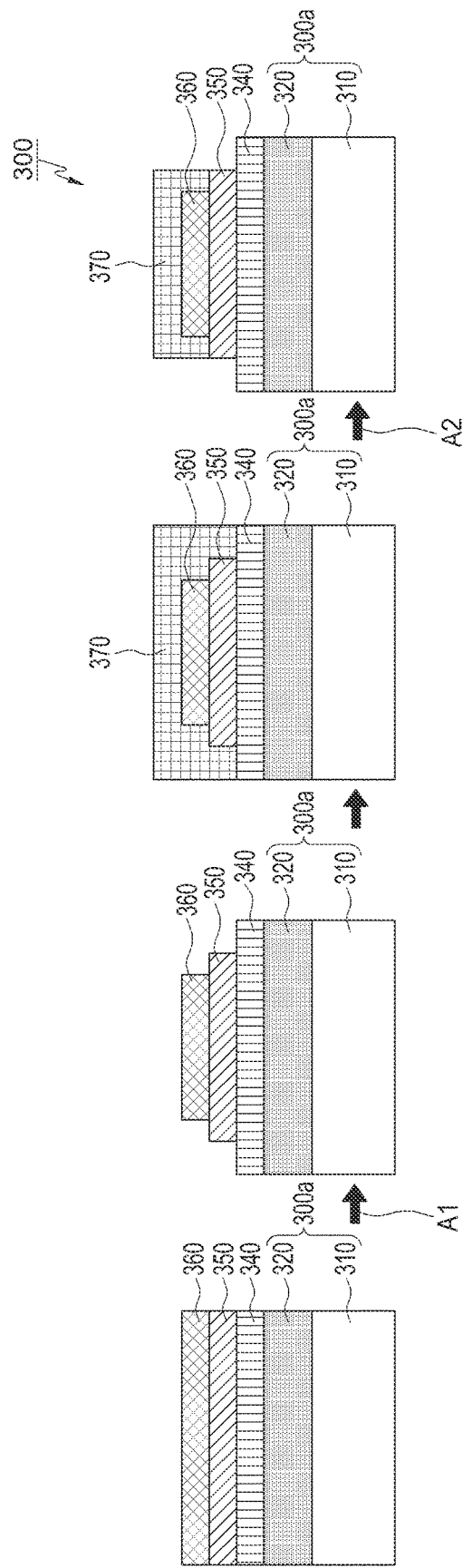
FIGS. 18A, 18B, 18C, and 18D sequentially illustrate an operation for fabricating a touch panel without a reflective coating layer according to an embodiment of the present disclosure.

As described before, FIGS. 18A to 18D sequentially illustrate an operation for fabricating a touch panel without a reflective coating layer according to an embodiment of the present disclosure. In FIG. 18A, the window unit 310 is fabricated in such a manner that the window unit 310 is divided into the visible area and the invisible area and the ink-printed layer 320 is provided on the top surface of the invisible area of the window unit 310. The organic coating layer 340 is provided on the top surface of the ink-printed layer 320 and the first conductive layer 350 is provided on the organic coating layer 340. The metal electrode layer 360 is provided on the top surface of the first conductive layer 350.

In FIG. 18B, the first pattern A1 is formed by etching the metal electrode layer 360. In FIG. 18C, in this state, the second conductive layer 370 is provided on the top surfaces of the first conductive layer 350 and the metal electrode layer 360. In FIG. 18D, the second pattern A2 is formed by etching the second conductive layer 370 so that the second conductive layer 370 may surround the metal electrode layer 360.

With the organic coating layer 340 covering foreign materials and bumps on the ink-printed layer 320, the first and second conductive layers 350 and 370 shield the top, bottom, and even side surfaces of the metal electrode layer 350, thereby preventing an adhesion failure of the metal electrode layer 360 and fundamentally preventing a defect originating from the side surfaces of the metal electrode layer 360. Accordingly, the adhesion of the metal electrode layer 360 may be reinforced.

Figure 19:
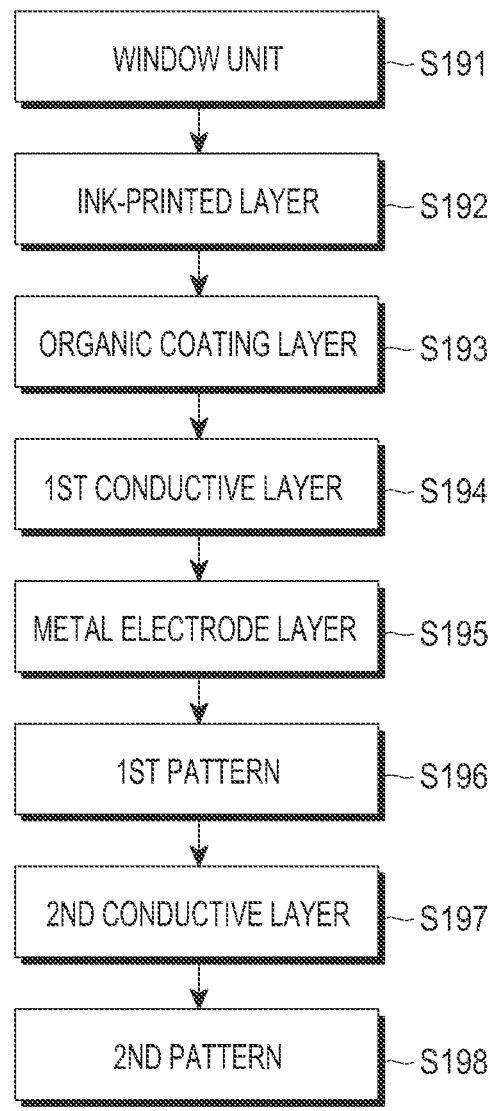
FIG. 19 is a flowchart illustrating a method for fabricating a touch panel without a reflective coating layer according to an embodiment of the present disclosure.

FIG. 19 is a flowchart illustrating a method for fabricating a touch panel without a reflective coating layer according to an embodiment of the present disclosure.

Referring to FIG. 19, the method for fabricating the touch panel 300 will be described below. The window substrate 300a including the window unit 310 divided into the visible area and the invisible area and the ink-printed layer 320 is fabricated of glass in operation S191.

Because the window substrate 300a is fabricated so as to include the window unit 310 and the ink-printed layer 320 without a conventional reflective coating layer, the number of parts in the touch panel 300 is decreased, this reducing fabrication cost.

The invisible area includes a bezel area of the window unit 310. The appearance of the window unit 310 is enhanced by applying ink or a black mattress to the invisible area.

The ink-printed layer 320 is provided on the top surface of the invisible area in operation S192.

The organic coating layer 340 is provided on the top surface of the ink-printed layer 320 to cover foreign materials and bumps on the surface of the ink-printed layer 320 in operation S193.

The first conductive layer 350 is provided on the top surface of the organic coating layer 340 in operation S194.

The metal electrode layer 360 is provided on the top surface of the first conductive layer 350 in operation S195.

The first pattern A1 is formed by etching the metal electrode layer 360 in operation S196.

The second conductive layer 370 is provided on the top surfaces of the first conductive layer 350 and the metal electrode layer 360 in operation S197.

The second pattern A2 is formed by etching the second conductive layer 370 so that the second conductive layer 370 may surround the metal electrode layer 360 in operation S198.

In the embodiment of the present disclosure, the organic coating layer 340 covers foreign materials and bumps on the surface of the ink-printed layer 320 and the top, bottom, and even side surfaces of the metal electrode layer 360 are shielded by the first and second conductive layers 350 and 370 formed on the organic coating layer 340. Therefore, a defect originating from the side surfaces of the metal electrode layer 360 is fundamentally prevented, thus reinforcing the adhesion of the metal electrode layer 360 is reinforced and preventing a product failure.

FIGS. 20A to 20D illustrate an operation for fabricating a touch panel without a reflective coating layer according to an embodiment of the present disclosure.

Referring to FIGS. 20A to 20D, a structure of a touch panel 400 will be described below. The touch panel 400 includes a window substrate 400a, an organic coating layer 440, a metal electrode layer 450, and a conductive layer 460.

The window substrate 400a may include a window unit 410 divided into a visible area (not shown) and an invisible area (not shown) and an ink-printed layer 420, without a conventional reflective coating layer.

The ink-printed layer 420 is provided on the top surface of the invisible area of the window unit 410 to render various colors.

The organic coating layer 440 is provided on the top surface of the ink-printed layer 420 to cover foreign materials or bumps on the surface of the ink-printed layer 420.

The metal electrode layer 450 is provided on the top surface of the organic coating layer 440 and etched into the first pattern A1.

The conductive layer 460 is provided on the top surface of the metal electrode layer 450 and etched into the second pattern A2, surrounding the metal electrode layer 450.

Since the touch panel 400 having the organic coating layer 440 is configured to include the single conductive layer 460 surrounding the metal electrode layer 450, the resulting obviation of the need for a conventional reflective coating layer and an additional conductive layer leads to a decrease in the number of parts, thus reducing fabrication cost and a fabrication process time. Furthermore, the side surfaces of the metal electrode layer 450 are shielded against outward exposure. Therefore, breakage during transfer and post-processing, a chemical change caused by moisture introduced from an ambient environment, discoloration, degradation of electrical characteristics, and weakened adhesion may be prevented for the metal electrode layer 450.

The operation principle and structure of the touch panel 400 are identical to those of the afore-described touch panels and thus will not be described herein to avoid redundancy.

Likewise, the conductive layer 460, the window unit 410, and the metal electrode layer 450 are formed of the same materials as those of their counterparts in the afore-described touch panels.

The touch panel 400 having the organic coating layer 440 is divided into a visible area and an invisible area. That is, the touch panel 400 includes a visible area visible to a user and an invisible area hidden by a bezel forming a part of a housing of an electronic device and thus invisible to the user. For example, although the touch panel 400 may output an image even in the invisible area, the image is invisible to the user because the image is hidden by the bezel.

Figure 20:
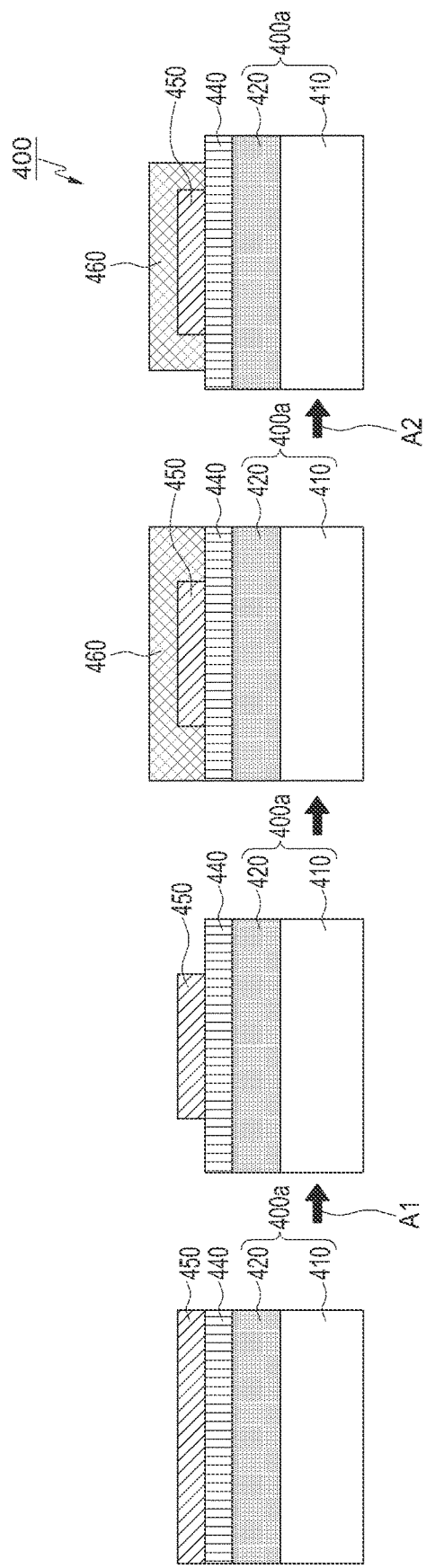
FIGS. 20A, 20B, 20C, and 20D sequentially illustrate an operation for fabricating a touch panel without a reflective coating layer according to an embodiment of the present disclosure.

As described before, FIGS. 20A to 20D sequentially illustrate an operation for fabricating a touch panel without a reflective coating layer according to an embodiment of the present disclosure. In FIG. 20A, the window unit 410 is fabricated in such a manner that the window unit 410 is divided into the visible area and the invisible area and the ink-printed layer 420 is provided on the top surface of the invisible area of the window unit 410. The organic coating layer 430 is provided on the top surface of the ink-printed layer 420 and the metal electrode layer 450 is provided on the top surface of the organic coating layer 440.

In FIG. 20B, the first pattern A1 is formed by etching the metal electrode layer 450. In FIG. 20C, in this state, the conductive layer 460 is provided on the top surfaces of the metal electrode layer 450. In FIG. 20D, the second pattern A2 is formed by etching the conductive layer 460 so that the conductive layer 460 may surround the metal electrode layer 450.

Since the single conductive layer 460 formed on the top surface of the organic coating layer 440 shields the side surfaces of the metal electrode layer 450, there is no need for an additional conductive layer. Therefore, fabrication cost and a fabrication process time may be reduced. With the organic coating layer 440 covering foreign materials and bumps on the ink-printed layer 420, the single conductive layer 460 surrounds the metal electrode layer 450, thereby preventing an adhesion failure of the metal electrode layer 450 and fundamentally preventing a defect originating from the side surfaces of the metal electrode layer 450. Accordingly, the adhesion of the metal electrode layer 450 may be reinforced. In addition, since the window substrate 400*a* is formed to include the window unit 410 and the ink-printed layer 420, without a conventional reflective coating layer, the resulting decrease in the number of parts leads to further reduction of the fabrication cost and the fabrication process time.

Figure 21:
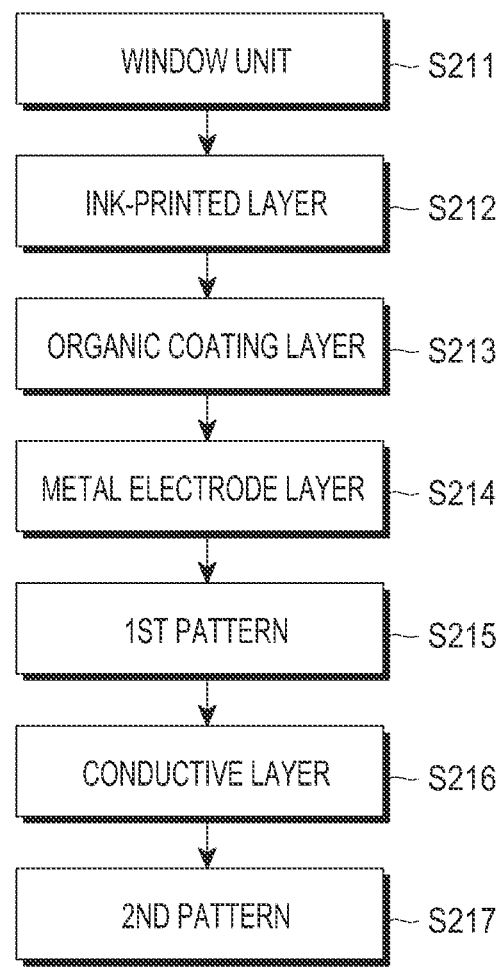
FIG. 21 is a flowchart illustrating a method for fabricating a touch panel having a reflective coating layer according to an embodiment of the present disclosure.

FIG. 21 is a flowchart illustrating a method for fabricating a touch panel without a reflective coating layer according to an embodiment of the present disclosure.

Referring to FIG. 21, the method for fabricating the touch panel 400 will be described below. The window substrate 400*a* including the window unit 410 divided into the visible area and the invisible area and the ink-printed layer 420 is fabricated of glass in operation S211.

Since the window substrate 400*a* is configured to include the window unit 410 and the ink-printed layer 420, without a conventional reflective coating layer, the resulting decrease in the number of parts may lead to reduction of fabrication cost and a fabrication process time.

The invisible area includes a bezel area of the window unit 410. The appearance of the window unit 410 is enhanced by applying ink or a black mattress to the invisible area.

The ink-printed layer 420 is provided on the top surface of the invisible area in operation S212.

The organic coating layer 440 is provided on the top surface of the ink-printed layer 420 to cover foreign materials and bumps on the surface of the ink-printed layer 420 in operation S213.

The metal electrode layer 450 is provided on the top surface of the organic coating layer 440 in operation S214.

The first pattern A1 is formed by etching the metal electrode layer 450 in operation S215.

The conductive layer 460 is provided on the top surface of the metal electrode layer 450 in operation S216.

The second pattern A2 is formed by etching the conductive layer 460 so that the conductive layer 460 may surround the metal electrode layer 450 in operation S217.

In the embodiment of the present disclosure, the organic coating layer 440 covers foreign materials and bumps on the surface of the ink-printed layer 420 and the top, bottom, and side surfaces of the metal electrode layer 450 are shielded by the single conductive layer 460 formed on the organic coating layer 440. Therefore, an additional conductive layer is not needed, thus reducing fabrication cost and a fabrication process time. Furthermore, a defect originating from the side surfaces of the metal electrode layer 450 is fundamentally prevented, thus reinforcing the adhesion of the metal electrode layer 450 and preventing a product failure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch panel comprising:
   a window substrate;
   a first conductive layer provided on a top surface of the window substrate;
   a metal electrode layer provided on a top surface of the first conductive layer and patterned into a first pattern; and
   a second conductive layer provided on top surfaces of the first conductive layer and the metal electrode layer and patterned into a second pattern, and surrounding the metal electrode layer directly on the top surface and lateral surfaces of the metal electrode layer,
   wherein the first conductive layer is provided on a top surface of a reflective coating layer of the window substrate, and the first conductive layer separates the entire second conductive layer and the entire metal electrode layer from the window substrate.

2. The touch panel of claim 1, wherein the window substrate comprises:
   a window unit divided into a visible area and an invisible area;
   an ink-printed layer provided on a top surface of the invisible area; and
   the reflective coating layer is provided on a top surface of the ink-printed layer.

3. The touch panel of claim 1, wherein the window substrate comprises:
   a window unit divided into a visible area and an invisible area; and
   an ink-printed layer provided on a top surface of the invisible area.

4. The touch panel of claim 1, wherein the first pattern and the second pattern are formed by etching.

5. A method for fabricating a touch panel, the method comprising:
   fabricating a window substrate;
   providing a first conductive layer on a top surface of the window substrate;
   providing a metal electrode layer on a top surface of the first conductive layer;
   patterning the metal electrode layer into a first pattern;
   providing a second conductive layer on top surfaces of the first conductive layer and the metal electrode layer; and
   patterning the second conductive layer into a second pattern, and surrounding the metal electrode layer with the second conductive layer directly on the top surface and lateral surfaces of the metal electrode layer,
   wherein the first conductive layer is provided on a top surface of a reflective coating layer of the window substrate, and the first conductive layer separates the entire second conductive layer and the entire metal electrode layer from the window substrate.

6. The method of claim 5, wherein the fabricating of the window substrate comprises:
   dividing a window unit into a visible area and an invisible area;
   providing an ink-printed layer on a top surface of the invisible area; and
   providing the reflective coating layer on a top surface of the ink-printed layer.

7. The method of claim 5, wherein the fabricating of the window substrate comprises:
   dividing a window unit into a visible area and an invisible area; and
   providing an ink-printed layer on a top surface of the invisible area.

8. A touch panel comprising:
   a window substrate;
   a metal electrode layer provided on a top surface of the window substrate and patterned into a first pattern; and
   a conductive layer provided on a top surface of the metal electrode layer and patterned into a second pattern, and surrounding the metal electrode layer directly on the top surface and lateral surfaces of the metal electrode layer,
   wherein the top surface of the window substrate comprises a reflective coating layer separating the conductive layer and the metal electrode layer from the window substrate, and
   wherein a top surface of the reflective coating layer directly contacts the conductive layer and the metal electrode layer, and a lower portion of the reflective coating layer contacts the window substrate.

9. The touch panel of claim 8, wherein the window substrate comprises:
   a window unit divided into a visible area and an invisible area;
   an ink-printed layer provided on a top surface of the invisible area; and
   the reflective coating layer is provided on a top surface of the ink-printed layer.

10. The touch panel of claim 8, wherein the window substrate comprises:
    a window unit divided into a visible area and an invisible area; and
    an ink-printed layer provided on a top surface of the invisible area.

11. The touch panel of claim 8, wherein the first pattern and the second pattern are formed by etching.

12. A method for fabricating a touch panel, the method comprising:
    fabricating a window substrate;
    providing a metal electrode layer on a top surface of the window substrate;
    patterning the metal electrode layer into a first pattern;
    providing a conductive layer on a top surface of the metal electrode layer; and
    patterning the conductive layer into a second pattern, and surrounding the metal electrode layer with the conductive layer directly on the top surface and lateral surfaces of the metal electrode layer,
    wherein the top surface of the window substrate comprises a reflective coating layer separating the conductive layer and the metal electrode layer from the window substrate,
    wherein a top surface of the reflective coating layer directly contacts the conductive layer and the metal electrode layer, and a lower portion of the reflective coating layer contacts the window substrate.

13. The method of claim 12, wherein the fabricating of the window substrate comprises:
    dividing a window unit into a visible area and an invisible area;
    providing an ink-printed layer on a top surface of the invisible area; and
    providing the reflective coating layer on a top surface of the ink-printed layer.

14. The method of claim 12, wherein the fabricating of the window substrate comprises:
    dividing a window unit into a visible area and an invisible area; and
    providing an ink-printed layer on a top surface of the invisible area.

15. A touch panel comprising:
    a window substrate;
    an organic coating layer provided on a top surface of the window substrate;
    a first conductive layer provided on a top surface of the organic coating layer;
    a metal electrode layer provided on a top surface of the first conductive layer and patterned into a first pattern; and
    a second conductive layer provided on top surfaces of the first conductive layer and the metal electrode layer and patterned into a second pattern, and surrounding the metal electrode layer directly on the top surface and lateral surfaces of the metal electrode layer,
    wherein the first conductive layer separates the entire second conductive layer and the entire metal electrode layer from the organic coating layer.

16. The touch panel of claim 15, wherein the window substrate comprises:
    a window unit divided into a visible area and an invisible area;
    an ink-printed layer provided on a top surface of the invisible area; and
    a reflective coating layer provided on a top surface of the ink-printed layer.

17. The touch panel of claim 15, wherein the window substrate comprises:
- a window unit divided into a visible area and an invisible area; and
- an ink-printed layer provided on a top surface of the invisible area.

18. The touch panel of claim 15, wherein the first pattern and the second pattern are formed by etching.

19. A method for fabricating a touch panel, the method comprising:
- fabricating a window substrate;
- providing an organic coating layer on a top surface of the window substrate;
- providing a first conductive layer on a top surface of the organic coating layer;
- providing a metal electrode layer on a top surface of the first conductive layer;
- patterning the metal electrode layer into a first pattern;
- providing a second conductive layer on top surfaces of the first conductive layer and the metal electrode layer; and
- patterning the second conductive layer into a second pattern, and surrounding the metal electrode layer with the second conductive layer directly on the top surface and lateral surfaces of the metal electrode layer,
- wherein the first conductive layer separates the entire second conductive layer and the entire metal electrode layer from the organic coating layer.

20. The method of claim 19, wherein the fabricating of the window substrate comprises:
- dividing a window unit into a visible area and an invisible area;
- providing an ink-printed layer on a top surface of the invisible area; and
- providing a reflective coating layer on a top surface of the ink-printed layer.

21. The method of claim 19, wherein the fabricating of the window substrate comprises:
- dividing a window unit into a visible area and an invisible area; and
- providing an ink-printed layer on a top surface of the invisible area.

22. A touch panel comprising:
- a window substrate;
- an organic coating layer provided on a top surface of the window substrate;
- a metal electrode layer provided directly on a top surface of the organic coating layer and patterned into a first pattern; and
- a conductive layer provided on a top surface of metal electrode layer and patterned into a second pattern, and surrounding the metal electrode layer directly on the top surface and lateral surfaces of the metal electrode layer,
- wherein the organic coating layer separates the conductive layer and the metal electrode layer from the window substrate.

23. The touch panel of claim 22, wherein the window substrate comprises:
- a window unit divided into a visible area and an invisible area;
- an ink-printed layer provided on a top surface of the invisible area; and
- a reflective coating layer provided on a top surface of the ink-printed layer.

24. The touch panel of claim 22, wherein the window substrate comprises:
- a window unit divided into a visible area and an invisible area; and
- an ink-printed layer provided on a top surface of the invisible area.

25. The touch panel of claim 24, wherein the first pattern and the second pattern are formed by etching.

26. A method for fabricating a touch panel, the method comprising:
- fabricating a window substrate;
- providing an organic coating layer on a top surface of the window substrate;
- providing a metal electrode layer directly on a top surface of the organic coating layer;
- patterning the metal electrode layer into a first pattern;
- providing a conductive layer on a top surface of the metal electrode layer; and
- patterning the conductive layer into a second pattern, and surrounding the metal electrode layer with the conductive layer directly on the top surface and lateral surfaces of the metal electrode layer,
- wherein the organic coating layer separates the conductive layer and the metal electrode layer from the window substrate.

27. The method of claim 26, wherein the fabricating of the window substrate comprises:
- dividing a window unit into a visible area and an invisible area;
- providing an ink-printed layer on a top surface of the invisible area; and
- providing a reflective coating layer on a top surface of the ink-printed layer.

28. The method of claim 26, wherein the fabricating of the window substrate comprises:
- dividing a window unit into a visible area and an invisible area; and
- providing an ink-printed layer on a top surface of the invisible area.

* * * * *